(12) United States Patent
Laine et al.

(10) Patent No.: US 6,520,062 B1
(45) Date of Patent: Feb. 18, 2003

(54) SYSTEMS AND METHODS FOR GENERATING ACOUSTIC AND SEISMIC SIGNALS

(75) Inventors: Loic Laine, Saint Doulchard (FR); Eric Jouseau, Bourges (FR); Christophe Boffano, Bourges (FR)

(73) Assignee: Giat Industries, Versailles (FR)

( * ) Notice: Subject to any disclaimer, the term of this patent is extended or adjusted under 35 U.S.C. 154(b) by 0 days.

(21) Appl. No.: 09/593,507

(22) Filed: Jun. 14, 2000

(30) Foreign Application Priority Data

Jun. 14, 1999 (FR) .............................................. 99 07695

(51) Int. Cl.[7] .............................................. F41H 11/12
(52) U.S. Cl. ......................................... 89/1.13; 89/1.11
(58) Field of Search .......................... 89/1.13; 102/402; 172/45, 91; 56/12.4, 12.5, 48, 294, 16.46

(56) References Cited

U.S. PATENT DOCUMENTS

| | | | |
|---|---|---|---|
| 2,425,357 A | * | 8/1947 | Walker |
| 2,509,163 A | * | 5/1950 | Musselman |
| 3,754,603 A | * | 8/1973 | Bogie |
| 4,006,795 A | | 2/1977 | Anstey |
| 4,172,481 A | * | 10/1979 | Brisson |
| 4,222,418 A | * | 9/1980 | McCray et al. |
| 4,572,258 A | * | 2/1986 | Mischel |
| 4,862,969 A | * | 9/1989 | Jobst et al. |
| 5,007,325 A | * | 4/1991 | MacWatt |
| 5,343,912 A | * | 9/1994 | Chronister et al. |
| 5,485,718 A | * | 1/1996 | Dallman |
| 5,786,542 A | * | 7/1998 | Petrovich et al. |
| 6,148,926 A | * | 11/2000 | Manor et al. |

FOREIGN PATENT DOCUMENTS

| | | | |
|---|---|---|---|
| FR | 0914286 | * | 10/1946 |
| WO | WO 97/46848 | | 12/1997 |

* cited by examiner

Primary Examiner—Michael J. Carone
Assistant Examiner—Troy Chambers
(74) Attorney, Agent, or Firm—Oliff & Berridge, PLC (57) ABSTRACT

A system and method for generating acoustic and seismic signals to clear mines equipped with acoustic and/or seismic sensors includes at least one drum driven rotationally by a drive to which drum at least one weight is attached by a fastening device positioning the at least one weight at a distance from drum, the weight being intended to strike the ground periodically as the drum rotates in order to generate an acoustic and seismic signal whose period is the same as that of the striking period of the weight.

17 Claims, 6 Drawing Sheets

SYSTEMS AND METHODS FOR GENERATING ACOUSTIC AND SEISMIC SIGNALS

BACKGROUND OF THE INVENTION

This invention is generally related to generating acoustic and seismic signals.

U.S. Pat. No. 5,125,317 discloses a seismic generator designed for a mine-clearing vehicle. This generator has a motor driving an unbalanced disk. This causes vibrations as the motor rotates. The generator is mounted near a vehicle axle and the vibrations are transmitted to the ground through the axle.

The main drawback of such a device is that it generates only one vibrational frequency (unimodal system). Hence it is not possible to simulate the entire frequency band generated by an actual vehicle, unless several generators with different frequencies are combined, which would be expensive and difficult to install in the vehicle. A single system of this type would not effectively clear modern antitank mines which have seismic sensors able to analyze the vibrational signal received. Moreover, the ratio between the power necessary to drive the motor and the power of the seismic/acoustic signals obtained is very low, mainly because the signals have to pass through the gear train of the vehicle, which adds interference to the initial signal. Hence the efficiency of such a device is low.

French Patent 2,748,560 discloses a mine-clearing system for triggering land mines placed, buried, or disposed at the side of the road. This system produces a seismic signal from its own drive wheels that have appropriate shapes.

This system has drawbacks as well. First, the power of the signal depends on the weight supported by the wheels, hence the weight of the carrying vehicle. Such a device cannot be implemented on a small remote-operated vehicle without a sharp efficiency loss. Moreover, the signal generated is once again unimodal and depends on the rate at which the vehicle moves; no signal can be generated when it is at rest.

It is also known, in particular from French Patent 914,284, that mines can be cleared by using weights attached to the ends of cables driven by a rotating drum. The goal of these devices is not to deceive an acoustic or seismic sensor but to cause buried mines to explode by impact.

In an area totally different from mine-clearing, U.S. Pat. No. 4,005,795 proposes a device for seismic prospecting from a ship. This device uses a drum with weights that strike an anvil that transmits the impacts thus produced to the hull of the ship. The weights are irregularly distributed around the drum to ensure generation of a random seismic signal. This randomness is necessary for implementing undersea prospecting processes and is unsuitable for a land mine-clearing application.

SUMMARY OF THE INVENTION

This invention provides systems and methods for generating acoustic and seismic signals that enable generation of seismic signals composed of several readily modifiable frequencies. The systems and methods according to the invention thus enable the seismic signature of an actual vehicle to be simulated. The systems and methods according to the invention also supply a high-power seismic signal whose frequency does not depend on the speed of the vehicle carrying it.

According to various exemplary embodiments of the invention, a system for generating acoustic and seismic signals designed to clear mines equipped with acoustic and/or seismic sensors includes at least one drum driven rotationally by a drive, to which drum at least one weight is attached by a fastening device positioning the weight at a distance from the drum, the weight striking the ground periodically as the drum rotates to generate an acoustic and seismic signal whose period is the same as that of the striking period of the weight.

In a first exemplary embodiment of the system according to the invention, the generator has at least a first group of weights attached to the drum with a regular distribution producing a first angular distance between two adjacent weights of the first group so that, by striking the ground, this first group generates an acoustic and seismic signal with a first frequency.

In a second exemplary embodiment of the system according to the invention, the generator has at least one second group of weights attached to the drum with a regular distribution producing a second angular distance between two adjacent weights of the second group and/or between a first weight in the first group and a first weight belonging to the second group, so that when the weights strike the ground an acoustic and seismic signal with a second frequency is produced.

The drum has grooves with regular angular spacing on its outer surface for connecting the fastening devices according to different angular distributions. The fastening devices have at least one connector cooperating with one of the grooves of the drum and at least one arm at the end of which the weight is attached.

According to various exemplary embodiments of the invention, the arm can have at least one chain or at least two articulated bars, the weight or weights can have at least one rotating wheel, and the signal generator can have at least two weights with different masses.

According to other various exemplary embodiments of the invention, a method for generating a seismic and acoustic signal for clearing mines equipped with acoustic and/or seismic sensors, the signal having at least one frequency and being generated by several weights striking the ground, includes fastening at least one weight to a drum at a distance from the drum and rotationally driving the drum near the ground, wherein the at least one weight strikes the ground periodically as the drum rotates to generate an acoustic and seismic signal whose period is the same as the striking period of the at least one weight.

Advantageously, this method can be adapted to generate a signal having at least two different frequencies, wherein the weights are made integral with the drum by fastening the weights at a distance from the drum at an angular distribution around the drum so that there are at least two groups of weights at at least two different angular distances on the drum, the drum is driven rotationally near the ground at a rotational speed such that the periodic impacts of the weights on the ground generate the signal.

In a first exemplary embodiment of the method according to the invention, the method also includes analyzing the frequency of the seismic signal to be simulated, determining at least two main frequencies of the signal and of the energies associated with these frequencies, determining a weight distribution in terms of mass and location on the drum to generate such a signal, and attaching the weights to the drum by the fastening devices with the determined angular distribution.

In a second exemplary embodiment of the method according to the invention, the rotational speed for the drum can be determined, then the drum can be driven rotationally in the vicinity of the ground at the determined rotational speed such that the periodic impacts of the weights on the ground generate the signal.

BRIEF DESCRIPTION OF THE DRAWINGS

Various exemplary embodiments of the invention will be described in detail with reference to the following drawings, wherein:

FIGS. 3a and 3b are detailed views showing an exemplary embodiment of a fastening device for attaching the weight, FIG. 3b being a partial section along plane AA in FIG. 3a;

FIGS. 5, 6, 7a, and 7b show various exemplary embodiments of the weight and fastening device, FIG. 7b being a detailed view of a wheel of the weight according to FIG. 7a.

DETAILED DESCRIPTION OF PREFERRED EMBODIMENTS

Figure 1:
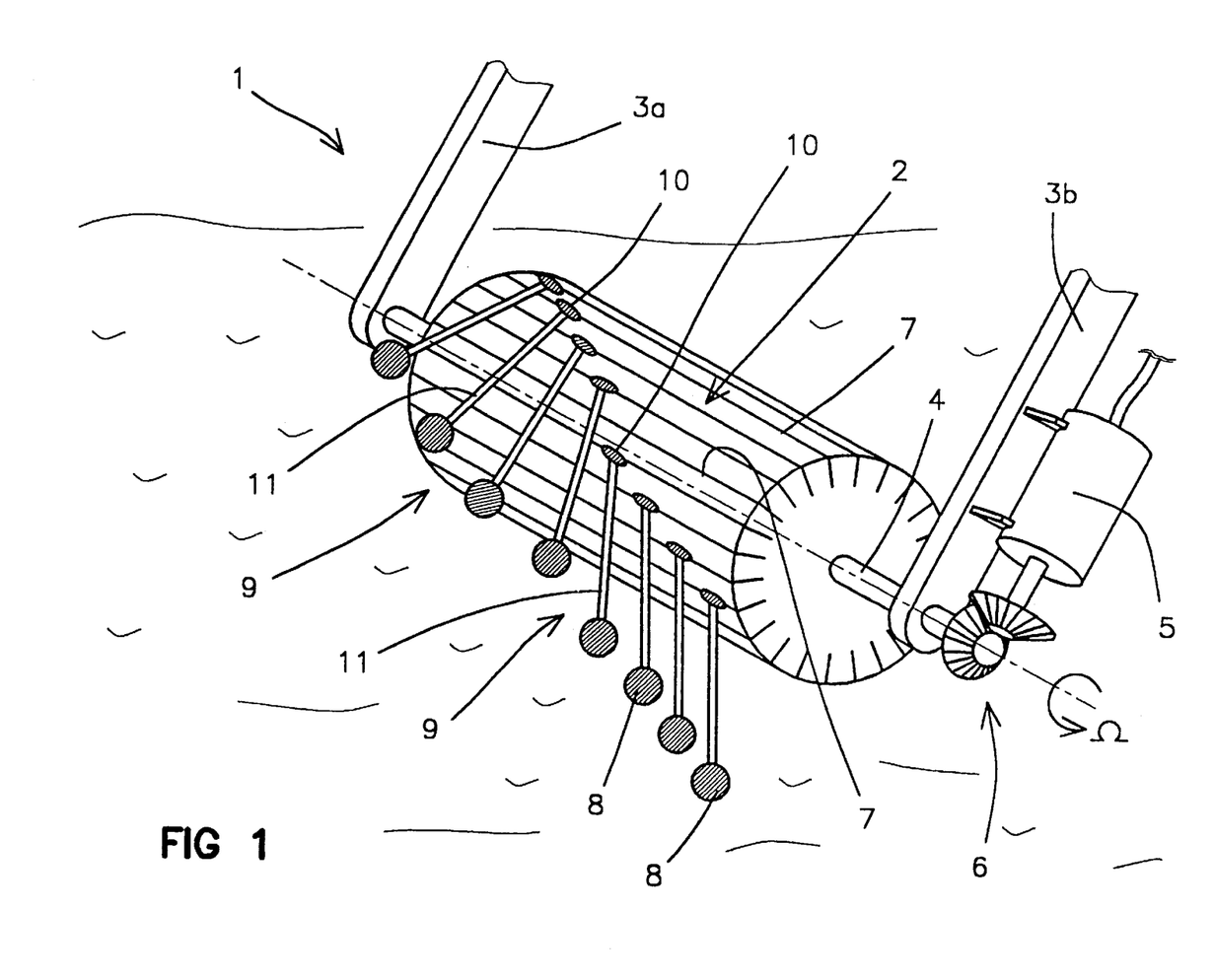
FIG. 1 is a perspective view of an acoustic and seismic signal generating signal according to a first embodiment of the invention.

Referring to FIG. 1, a system 1 for generating acoustic and seismic signals according to the invention has a drum 2 rotatably mounted between two arms 3a and 3b. The arms 3a and 3b are connected to a vehicle (not shown). The drum 2 has a shaft 4 driven rotationally at a speed $\Omega$ by a drive 5 and by a transmission 6. The drive 5 may be, for example, an electric motor supplied by an energy source (not shown). The drum 2 has longitudinal grooves 7 on its outer cylindrical surface enabling weights 8 to be attached by fastening devices 9. Each fastening device 9 has a connector 10 that cooperates with a groove 7 of the drum 2 and an arm 11 at the end of which a weight 8 is attached.

Figure 3A:
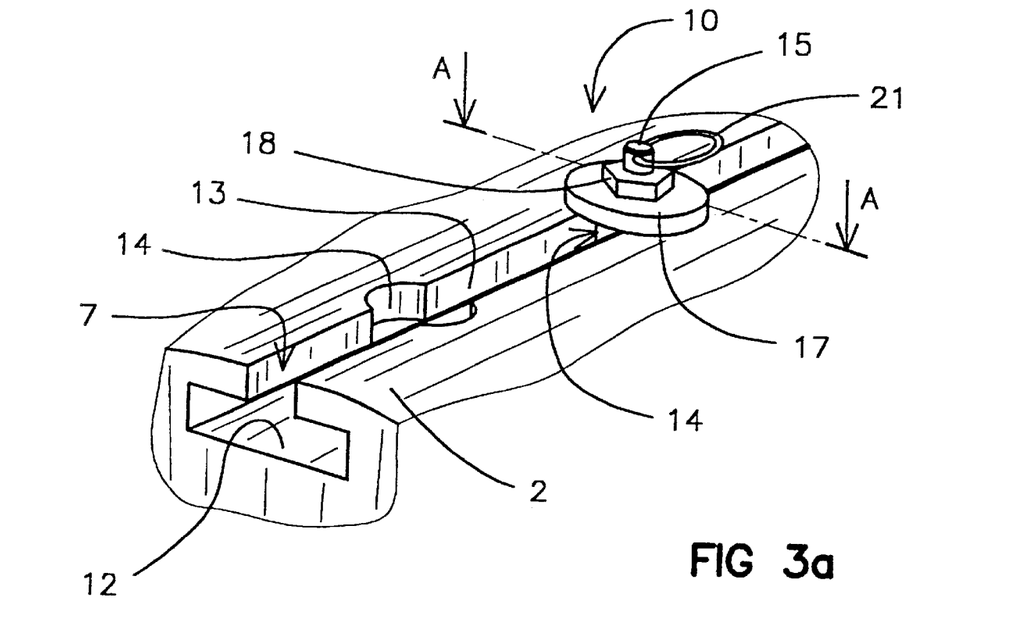
Figure 3B:
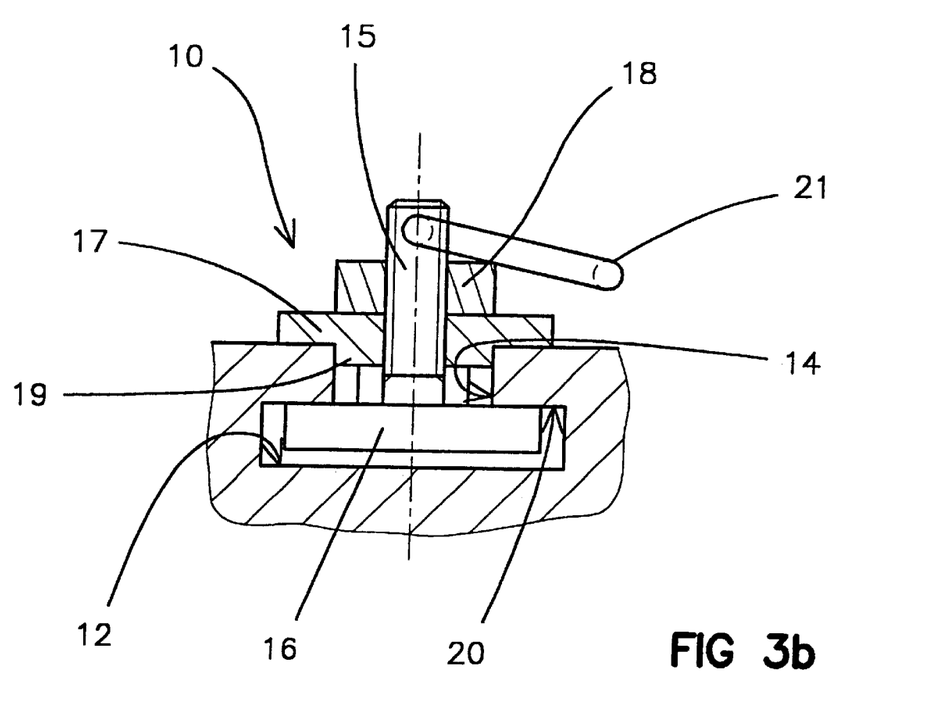

An exemplary embodiment of the connector 10 is shown with reference to FIGS. 3a and 3b. The grooves 7 have a T-shaped profile extending throughout the length of the drum 2 including a wide groove bottom 12 connected to the outer surface of the drum 2 by a narrow gap 13. Cylindrical notches 14 are provided at regular intervals along each groove 7 enabling the connector 10 to be positioned lengthwise relative to drum 2. The connector 10 has a rod 15 with an enlarged head 16 whose diameter is greater than the width of gap 13, and which is positioned in the wide groove bottom 12. The rod 15 is threaded and receives a washer 17 that has a cylindrical nipple 19 cooperating with the cylindrical notch 14 to fix the connector 10 lengthwise relative to the groove 7. The washer 17 has a smooth bore receiving the rod 15 and a nut 18 is screwed on the rod 15 and applies the washer 17 against the drum 2 and applies the enlarged head 16 of the rod 15 against an upper surface 20 of the wide groove bottom 12, thus locking the connector 10 relative to the drum 2.

The connection between the connector 10 and the arm 11 is provided by an articulation device 21, for example a split ring passing through a hole in the rod 15, the ring having a fast-opening or hooking system. Such rings are known particularly in the area of sailing or mountaineering equipment and will not be described in further detail.

Figure 2:
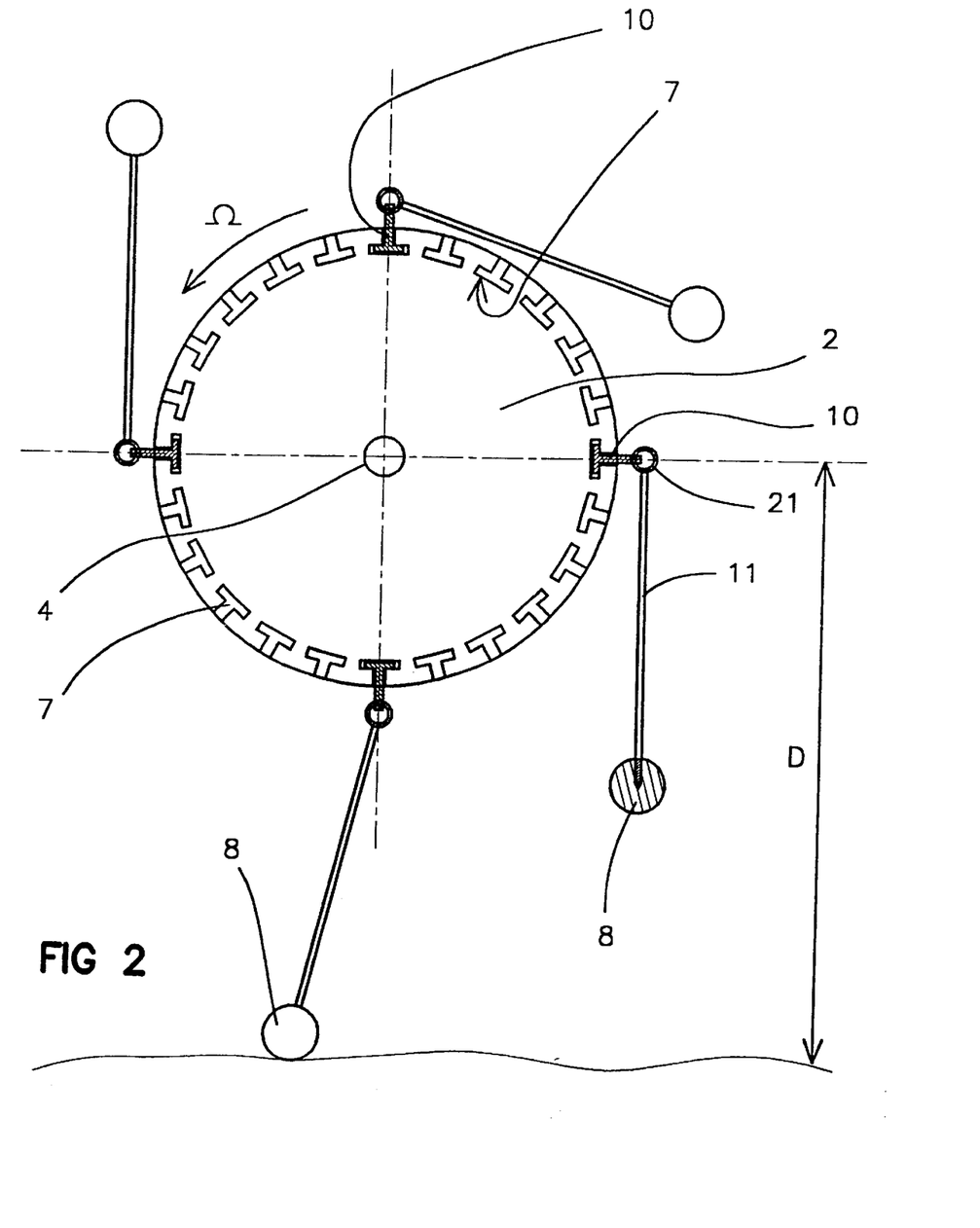
FIG. 2 is a detailed side view of the drum shown in FIG. 1.

FIG. 2 shows the drum 2 in a side view. The drum 2 is shown equipped with four weights 8. The weights 8 are regularly distributed angularly and their connectors 10 are thus spaced 90° apart from each other. Each weight 8 can be a sphere with a diameter, for example, of 50 to 70 millimeters and made of steel, for example. The weight 8 can have an internal thread enabling it to be fastened to a thread on the arm 11. The weight 8 can weigh approximately 0.5 to 1 kilogram.

The shaft 4 of the drum 2 is positioned by arms 3a, 3b at a distance D from the ground such that when drum 2 rotates, the weights 8 strike the ground periodically. Because of these impacts of the weights 8 on the ground, the acoustic and seismic signal generated has the same period as the weight-striking period.

With the drum 2 being driven by the drive 5 at rotational speed $\Omega$ (expressed in rps), the frequency of the signal generated in this case is $f=4\times\Omega$. It can be seen that it is possible to vary the frequency of this signal by altering speed $\Omega$ or, at a constant rotational speed, by altering the number and angular distribution of the weights 8 on drum 2. According to various exemplary embodiments, the weights 8 are distributed so that the drum 2 is statically and dynamically balanced to avoid imbalance phenomena.

Figure 4A:
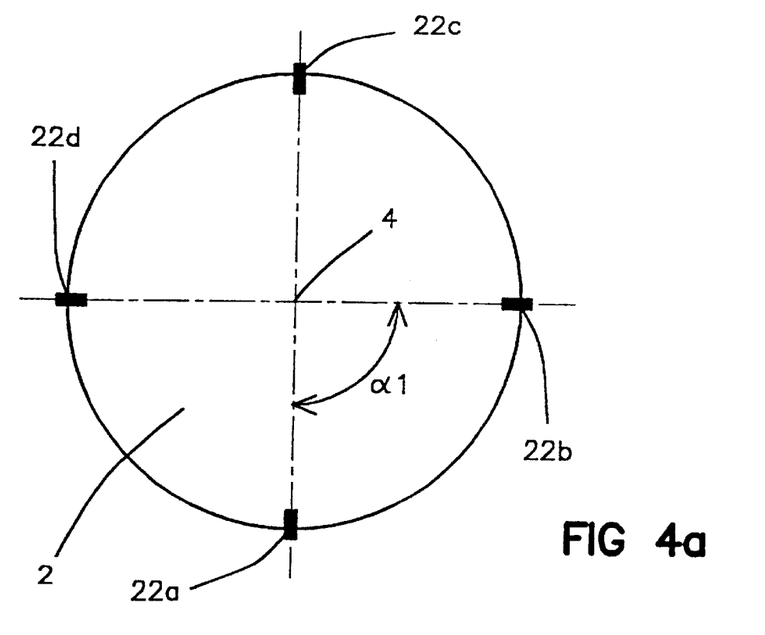
FIGS. 4a and 4b are schematic side views of the drum showing two exemplary embodiments of the distributions of the weights.
Figure 4B:
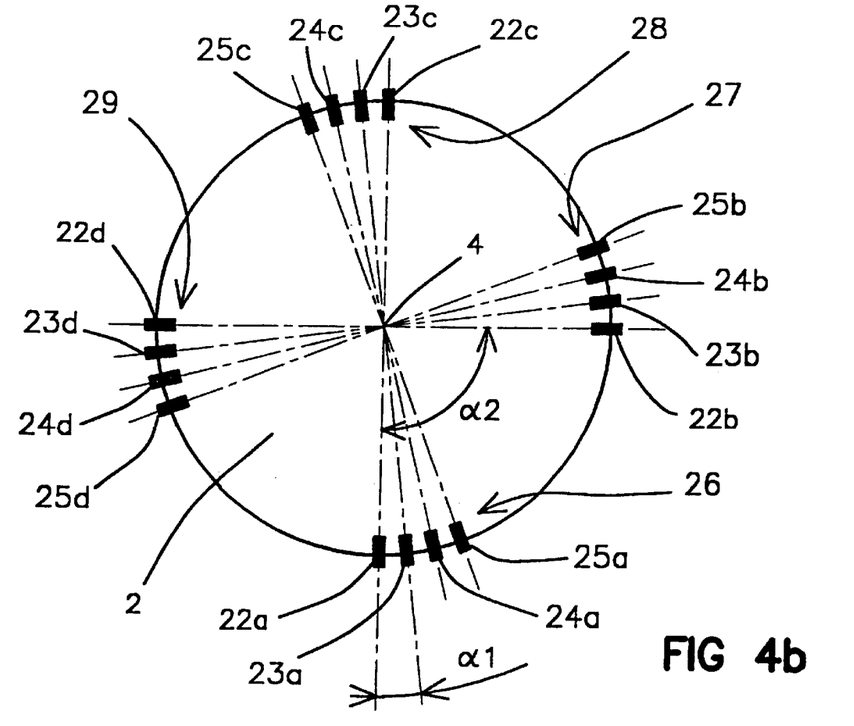

FIGS. 4a and 4b thus show schematically two exemplary embodiments of weight distributions. FIG. 4a shows a distribution similar to that of FIG. 2. The first group has four weights of which only locations 22a, 22b, 22c, and 22d of the attachment points on the drum 2 are shown for reasons of clarity. These attachment points are regularly distributed to produce a first angular distance $\alpha 1$ ($\alpha 1=90°$) between two adjacent weights. By striking the ground, this first group of weights produces a first frequency $f1=4\times\Omega$ ($\Omega$ being in rps).

FIG. 4b shows another weight distribution in which four groups of four weights are provided. A first group 26 is formed of four weights attached to the drum 2 at locations 22a, 23a, 24a, and 25a and produces an angular distance $\alpha 1=9°$ between each pair of adjacent weights. A second group 27 is also formed of four weights attached to the drum 2 at locations 22b, 23b, 24b, and 25b 9° apart from each other. Similarly, a third group 28 of weights attached to the drum 2 at locations 22c, 23c, 24c, and 25c and a fourth group 29 of weights attached to the drum 2 at locations 22d, 23d, 24d, and 25d are formed of weights 9° apart from each other. The overall distribution of the weights on the drum 2 of FIG. 4b has a symmetry of rotation of approximately four weights around the shaft 4 of the drum 2. In other words, the second group 27 of weights has an angular distance $\alpha 2=90°$ with the first group 26. The angle of 90° is thus respectively between the locations 22a and 22b, 23a and 23b, 24a and 24b, and 25a and 25b. This 90° distance is also found between the second group 27 and the third group 28 as well as between the third group 28 and the fourth group 29.

When the drum according to FIG. 4b rotates, the first group 26 of weights strikes the ground generating a first acoustic and seismic signal with a first frequency $f1=40\times\Omega$ (where $\Omega$ is in rps). This first frequency f1 is also produced when each of the other groups of weights strikes the ground, the angular distance $\alpha 1=9°$ being the same within each of these groups. The successive impacts of the four groups $\alpha 2=90°$ apart also generates a second signal with frequency $f2=4\times\Omega$ superimposed on the first signal. It can thus be seen that, by appropriately choosing the weight distribution on the drum 2, a complex signal composed of several frequencies can be generated. More generally, a group of weights separated by an angle a generates a signal with frequency $f=\Omega\times 2\pi/\alpha$ (where $\Omega$ is in radians/second and $\alpha$ is in radians).

Alternatively, it would be possible to provide a third angular distance between each of the weights in the second group 27 and the fourth group 29. As a result, a third frequency would be superimposed on those generated by distances α1 and α2. The rotational speed Ω of the drum 2 can also be changed to modify or to modulate the frequencies generated. The various weights 8 could weigh different amounts, thus enabling the signals to be amplitude-modulated. The greater the mass of the weight, the greater the energy emitted in the frequency band in which it participates.

As an example, in FIG. 4*b*, the weights at locations 22*a*, 22*b*, 22*c*, and 22*d* could have twice the mass of the others. The energy associated with frequency signal f2=4×Ω would then be double that associated with the signal having frequency f1=40×Ω. It will thus been seen that, with the systems and methods according to the invention, it is easy to generate a seismic signal with given amplitude and frequency characteristics.

First, the frequency of the seismic signal to be simulated is analyzed. The analysis is conducted for example with a time/frequency analyzer connected to a geophone. It determines the 2 to 4 main frequencies of the signal to be reproduced, as well as the energies to be associated with these frequencies. The distribution of the weights 8 in terms of mass and location on the drum 2 is then chosen so that the drum 2 can generate such a signal and the rotational speed Ω of the drum 2 can be determined. The weights 8 are then connected to the drum by the fastening devices 9, and with the desired angular distribution. Finally, the drum 2 is driven rotationally by the drive 5 near the ground at a rotational speed such that the periodic impacts of the weights 8 on the ground generate the signal.

In the systems and methods according to the invention, it is easy to change the shape of the signal simply by changing the distribution of the weights 8 on the drum 2. It is thus not necessary to change the entire system. The signal obtained has a relatively large power and small size, and is efficient in terms of acoustic and seismic power emitted the for mechanical power supplied. There is little residual parasitic noise. Moreover, the rotational speed Ω of the drum 2 is independent of the speed at which the vehicle carrying it moves. The rotational speed Ω of the drum 2 is chosen according to the frequencies of the signals to be generated. It is approximately several revolutions per second (3 to 5 rps).

Figure 5:
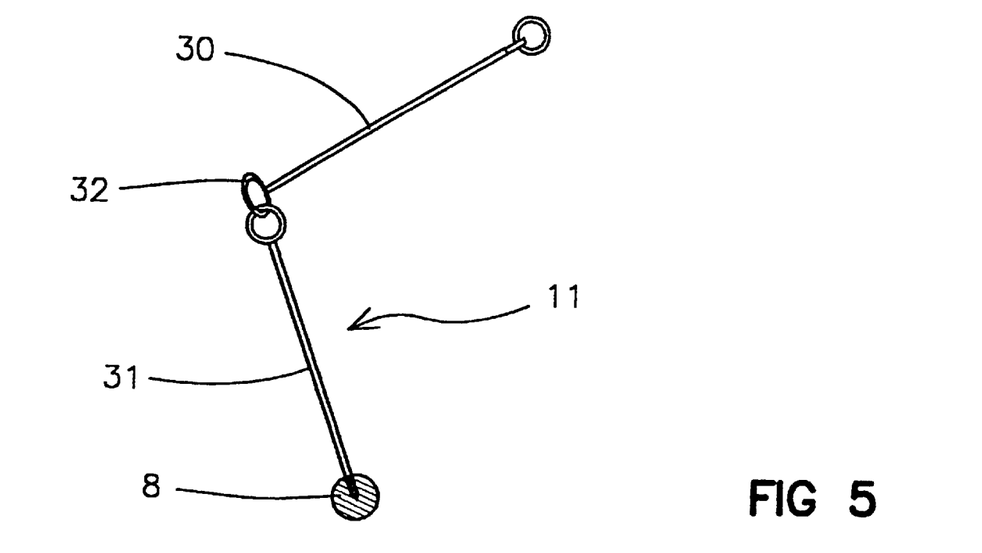

It is possible for the weights 8 and the arms 11 to have different shapes without thereby departing from the scope of the invention. Referring to FIG. 5, the arm 11 can be in the shape of a whip with two rods 30 and 31 connected by an articulation device 32. This embodiment increases the flexibility of the arms 11, which is useful on rough ground.

Figure 6:
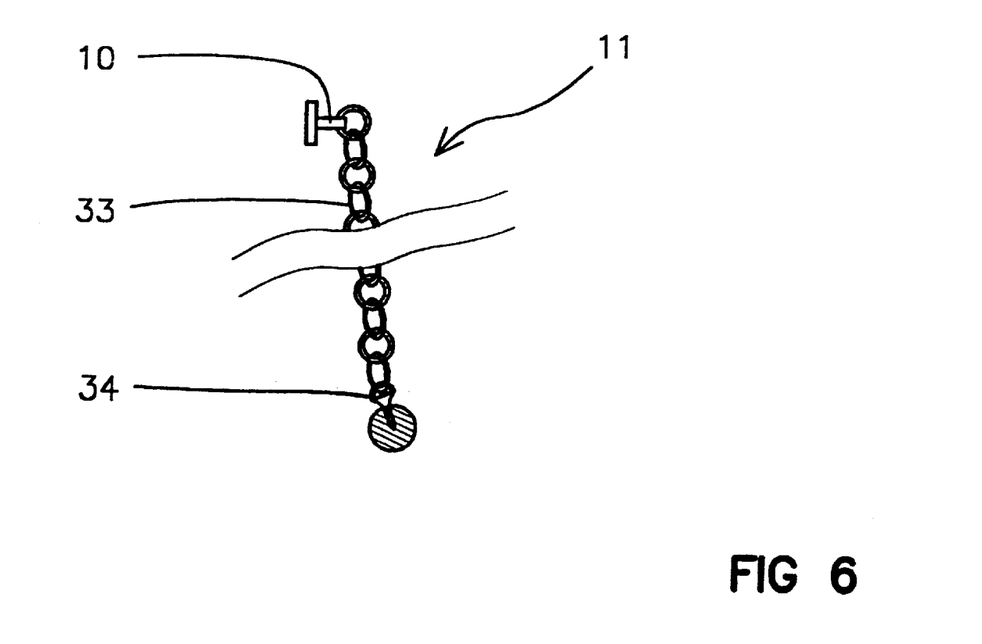

FIG. 6 shows an arm 11 made of a flexible chain 33 whose upper link is attached to the connector 10 and whose lower link is attached to a screw 34 integral with the weight 8. This embodiment also further increases the flexibility of the arms 11.

Figure 7A:
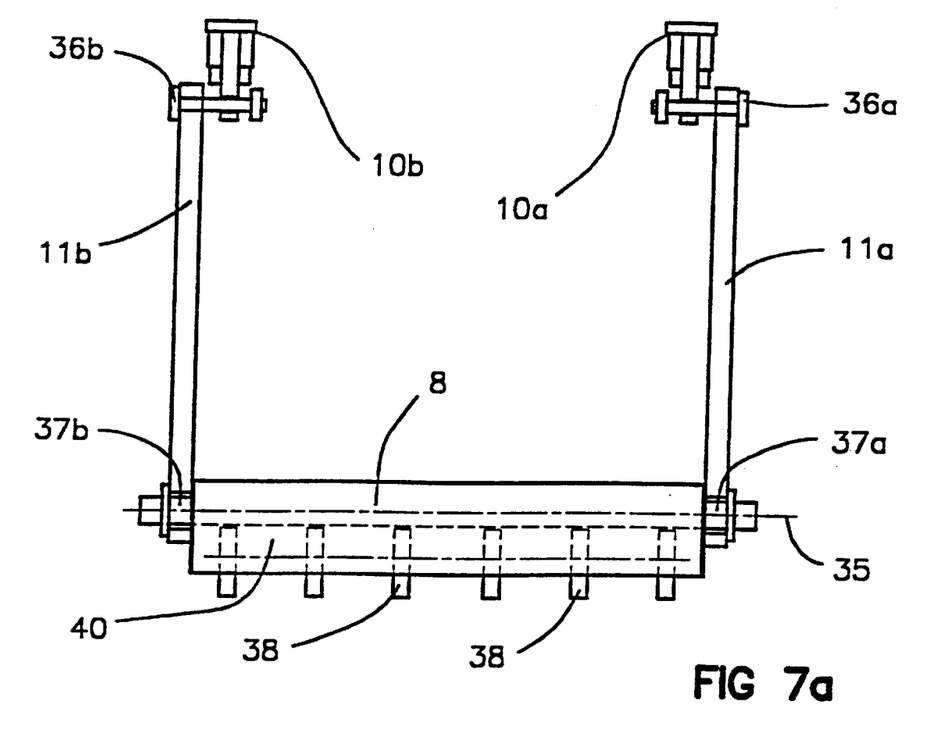
Figure 7B:
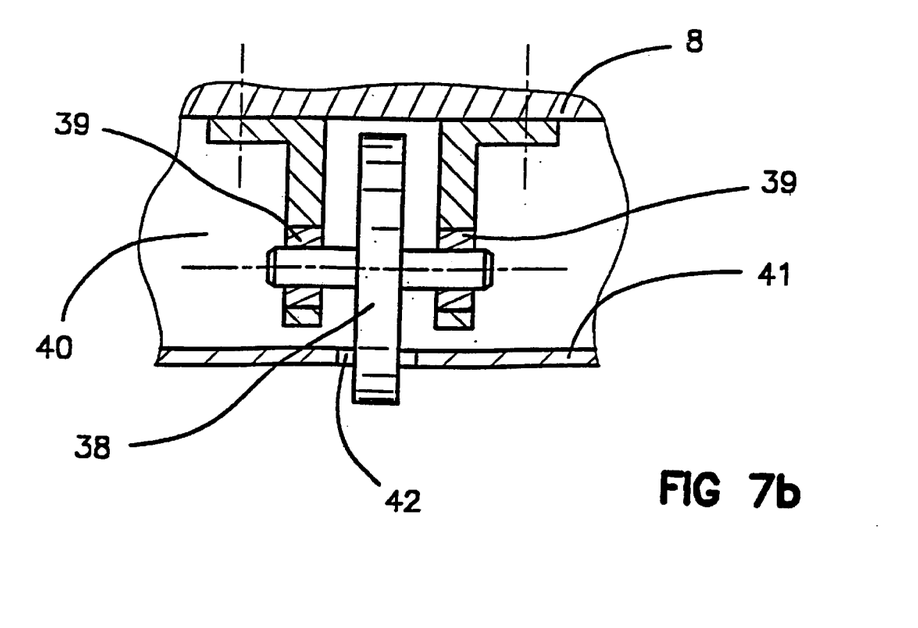

FIG. 7*a* shows a weight 8 substantially in the shape of an elongate cylinder whose axis 35 is parallel to that of drum 2 and is connected to the drum 2 by two arms 11*a* and 11*b*. Each arm 11*a* and 11*b* has an upper articulation device 36*a* and 36*b* (for example a rod) that connects it to connectors 10*a* and 10*b* for fastening it on the drum 2. Each arm 11*a* and 11*b* is also articulated at its lower end at axes 37*a* and 37*b* of the weight 8. According to this embodiment, the weight 8 has wheels 38 rotatably mounted on bearings 39 integral with the weight 8. To enable the wheels 38 to be mounted, the weight 8 has an internal cavity 40 closed by a lid 41 having slots 42 allowing the wheels 38 to pass through. This embodiment distributes the impact over a greater surface area thus reducing pressure on the ground so that pressure mines are not tripped. It is also suitable for producing seismic signals on a hard surface such as a road, thus making it possible to use a relatively heavy weight without affecting the energy efficiency of the system as the wheels prevent frictional contact with the ground.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A system for generating acoustic and seismic signals to clear mines equipped with at least one of an acoustic sensor and a seismic sensor for analyzing acoustic and seismic signals received by said at least one sensor, comprising:

at least one drum driven rotationally by a drive; and a plurality of weights attached to the drum by one or more fastening devices that position the weights at one or more locations about the drum and at one or more distances from the drum and with an angular distribution to generate acoustic and seismic signals with periods the same as the striking periods of the weights as the drum rotates, and with modifiable frequencies and amplitudes to be sensed by the at least one of the acoustic and the seismic sensor.

2. The system according to claim 1, further comprising:

at least a first group of weights attached to the drum with a regular distribution producing an angular distance between two adjacent weights of the first group, wherein by striking the ground the first group of weights generates an acoustic and seismic signal with a first frequency.

3. The system according to claim 2, further comprising:

at least one second group of weights attached to the drum with a regular distribution producing a second angular distance between two adjacent weights of the second group and between a first weight in the first group and a first weight belonging to the second group, wherein when the second group of weights strike the ground an acoustic and seismic signal with a second frequency is produced.

4. A system for generating acoustic and seismic signals to clear mines equipped with at least one of an acoustic sensor and a seismic sensor, comprising:

at least one drum driven rotationally by a drive; and at least one weight attached to the drum by a fastening device that positions the weight at a distance from the drum, wherein the at least one weight strikes the ground periodically as the drum rotates to generate an acoustic and seismic signal whose period is the same as the striking period of the at least one weight, wherein the drum has grooves with regular angular spacing on its outer surface for connecting the fastening device according to different angular distributions.

5. The system according to claim 4, wherein the fastening device has at least one connector cooperating with one of the grooves of the drum and at least one arm at the end of which the at least one weight is attached.

6. The system according to claim 5, wherein the arm has at least one chain.

7. The system according to claim 5, wherein the arm has at least two articulated bars.

8. A system for generating acoustic and seismic signals to clear mines equipped with at least one of an acoustic sensor and a seismic sensor, comprising:
   at least one drum driven rotationally by a drive; and
   at least one weight attached to the drum by a fastening device that positions the weight at a distance from the drum, wherein the at least one weight strikes the ground periodically as the drum rotates to generate an acoustic and seismic signal whose period is the same as the striking period of the at least one weight, wherein the at least one weight has at least one rotating wheel.

9. A system for generating acoustic and seismic signals to clear mines equipped with at least one of an acoustic sensor and a seismic sensor, comprising:
   at least one drum driven rotationally by a drive; and
   at least one weight attached to the drum by a fastening device that positions the weight at a distance from the drum, wherein the at least one weight strikes the ground periodically as the drum rotates to generate an acoustic and seismic signal whose period is the same as the striking period of the at least one weight, wherein the at least one weight includes at least two weights with different masses.

10. The system according to claim 8, further comprising:
    at least a first group of weights attached to the drum with a regular distribution producing an angular distance between two adjacent weights of the first group, wherein by striking the ground the first group of weights generates an acoustic and seismic signal with a first frequency.

11. The system according to claim 10, further comprising:
    at least one second group of weights attached to the drum with a regular distribution producing a second angular distance between two adjacent weights of the second group and between a first weight in the first group and a first weight belonging to the second group, wherein when the second group of weights strike the ground an acoustic and seismic signal with a second frequency is produced.

12. The system according to claim 9, further comprising:
    at least a first group of weights attached to the drum with a regular distribution producing an angular distance between two adjacent weights of the first group, wherein by striking the ground the first group of weights generates an acoustic and seismic signal with a first frequency.

13. The system according to claim 12, further comprising:
    at least one second group of weights attached to the drum with a regular distribution producing a second angular distance between two adjacent weights of the second group and between a first weight in the first group and a first weight belonging to the second group, wherein when the second group of weights strike the ground an acoustic and seismic signal with a second frequency is produced.

14. A method for generating a seismic and acoustic signal for clearing mines with a device, the mines having at least one of an acoustic sensor and a seismic sensor, the signal being generated by a plurality of weights striking the ground and being composed of a number of modifiable frequencies and amplitudes, comprising:
    fastening the plurality of weights to a drum at one or more distances from the drum and with an angular distribution on the drum; and
    rotationally driving the drum near the ground, wherein the plurality of weights strike the ground periodically as the drum rotates to generate acoustic and seismic signals whose period is the same as the striking period of the weights and which has modifiable frequencies and amplitudes to be sensed by the at least one of the acoustic and the seismic sensor.

15. The method according to claim 14, wherein positioning the plurality of weights includes fastening at least a first group of weights and a second group of weights to the drum by fastening devices that position the weights at a distance from the drum at an angular distribution around the drum such that the at least two groups of weights are at at least two different angular distances on the drum, and the periodic impacts of the weights on the ground generate a signal having at least two different frequencies.

16. A method for generating a seismic and acoustic signal for clearing mines equipped with at least one of an acoustic sensor and a seismic sensor, the signal being generated by weights fastened to a rotating drum by fastening devices comprising:
    analyzing a frequency of the seismic signal to be simulated;
    determining at least two main frequencies of the signal and of the energies associated with the at least two main frequencies;
    determining a weight distribution in terms of mass and location on the drum so that the latter is able to generate such a signal; and
    attaching the weights to the drum with the determined distribution.

17. The method according to claim 16, further comprising:
    determining the rotational speed for the drum; and
    driving the drum rotationally in the vicinity of the ground at the determined rotational speed such that the periodic impacts of the weights on the ground generate the signal.

* * * * *